Dec. 30, 1930.  D. O. LIMA  1,787,256
SPECIFIC GRAVITY BALANCE
Filed Nov. 4, 1929
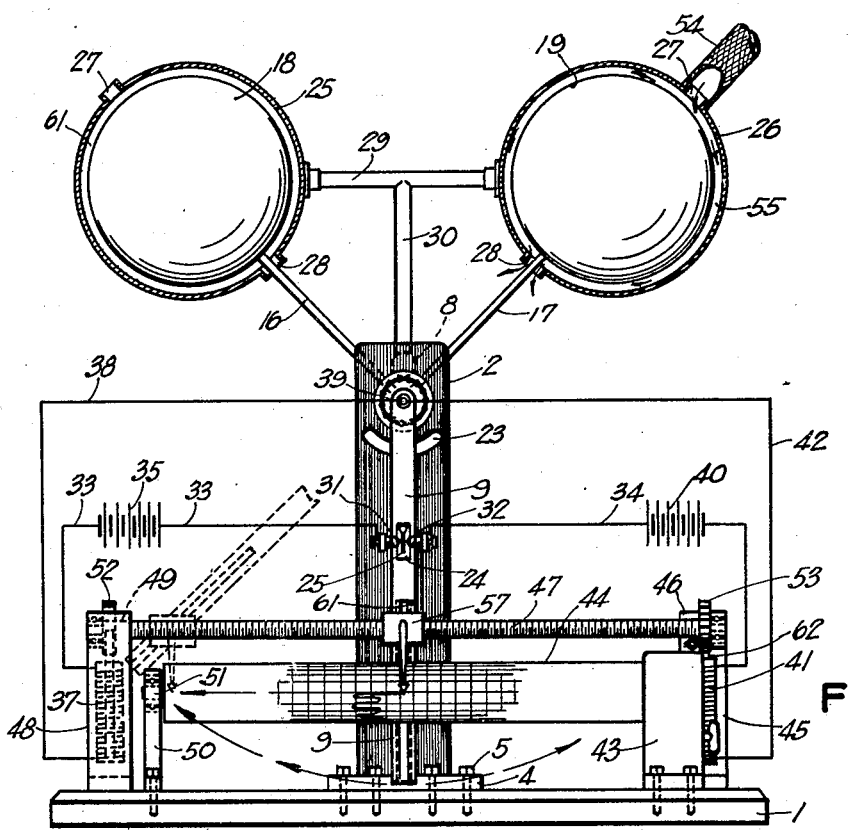
FIG. 1.
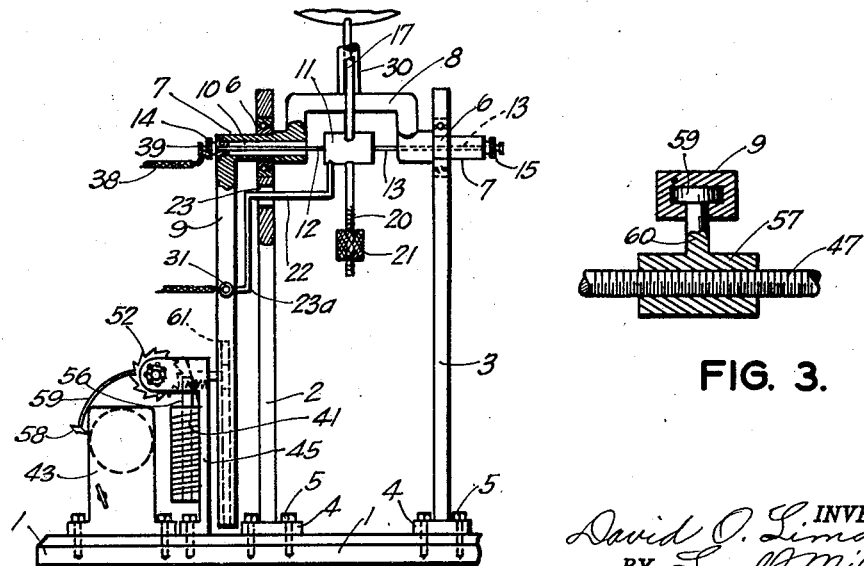
FIG. 2.
FIG. 3.
David O. Lima INVENTOR
BY Loyal J. Miller
ATTORNEY Patented Dec. 30, 1930

1,787,256

UNITED STATES PATENT OFFICE

DAVID O. LIMA, OF OKLAHOMA CITY, OKLAHOMA

SPECIFIC-GRAVITY BALANCE

Application filed November 4, 1929. Serial No. 404,634.

My invention relates to a device for measuring and recording the comparative gravity of fluids and gaseous substances.

The objects of my invention are to provide a device of this class which is new, novel, practical and of utility; which will measure the gravity of one gas or fluid in terms of its relation to another gas or fluid, rather than in terms of fixed weights, in such a manner that the precision of weighing is unaffected by variations of pressure and temperature, providing that the densities of both fluids are equally affected by such variations and that both fluids remain at the same temperature; a device which will be self-compensating for pressure and temperature; a device with which no auxiliary device or tabulation is needed for the purpose of calculating or compensating the effects of variations of pressure and temperature on the densities shown by the device; a device which will automatically record its readings upon a chart which will be particularly useful in measuring the content of carbondioxide in flue gases; and which may be further adapted to automatically open and close fire box drafts in a manner to promote the efficient consumption of fuel; which will be efficient in accomplishing all the purposes for which it is intended.

With these and other objects in view as will more fully appear, my invention consists in the construction, novel features, and combination of parts hereinafter more fully described, pointed out in the claims hereto appended, and illustrated in the accompanying one-sheet drawing, of which, Figure 1 is a front elevational view of the device.

Figure 2 is a side elevational view, partly in section; and

Figure 3 is a sectional view showing a fragment of the long screw, its threaded nut and a cross section of the swinging arm.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

One practical embodiment of the invention as illustrated in the drawings comprises:

A base 1 of suitable form and material, vertically arising from which are upright standards 2 and 3. Said standards at their base portions are outflanged as shown at 4 and are secured to the base 1 by a plurality of bolts 5. Adjacent their upper portion said standards 2 and 3 are provided with horizontally alined bearings 6. The bearings 6 support a crank shaft 7, having a central portion 8 which is offset vertically from said shaft's axis. The outward end of the shaft 7 which extends through the bearing 6 disposed upon said standard 2 is provided with a vertically downstanding arm 9. The axis of shaft 7 is provided with a through bore from end to end. Disposed within the offset of the shaft 7 is a shorter shaft 11 the axis of which is identical with the axis of shaft 7. Shaft 11 is supported by thin flat springs 12 and 13 under tension. Spring 12 is attached at the axial center of the adjacent end of shaft 11, the other end of the spring, which passes through the bore 10, is secured to the threaded tension means 14 which is received into the forward end of shaft 7. In like manner tension spring 13 is attached to the other and adjacent end of said shaft 11, passes through the rear extension of shaft 7 and at the outer end of the latter and is secured by the threaded tension means 15. If desired, pivot pins or knife edges may be substituted for said spring suspension members 12 and 13.

Arising from the central portion of said shaft 11, at one side of its vertical diametric center is an arm 16. Said arm will be rigidly secured to shaft 11 in any usual efficient manner and arises therefrom at a desired angle, such as is best shown in Fig. 1, which is approximately 45 degrees from the vertical. A similar arm 17 arises from the opposite upper central portion of said shaft 11 at an angle of approximately 45 degrees from the vertical, said arms being alined and having an angle thereinbetween of approximately 90 degrees. Upon the upper ends respectively, of each of said arms 16 and 17 are rigidly disposed the hollow balls 18 and 19, of thin aluminum or the like.

Vertically depending from the diametric center of said shaft 11, and attached thereto in a rigid manner is a threaded shaft 20 supporting counterbalance 21. Also extending from the diametric center of said shaft 11, but from a point adjacent said shaft's forward end is the contact arm 22. This arm as illustrated in Fig. 2, extends downward, thence at right angles forward through a slot shown as 23 in the standard 2, thence again at right angles downward, and adjacent its lower end is turned forward as shown at 23a, at right angles to its last downward portion. The free end of said arm 22 projects forwardly into a slot shown as 24 in said arm 9, and therein is provided with a two faced electrical contact 25.

Loosely surrounding respectively the said balls 18 and 19 are the hollow spheres or shells 25 and 26, each of which is provided at diametrically opposite points with outwardly flanged openings respectively shown as 27 and 28. Through each of said openings 28 extends one of the supporting arms 16 and 17 upon which are positioned the said balls 18 and 19. Each said opening 28 is sufficiently large to allow an unrestricted movement therein over an arc of small degree of the arm 16 or 17 passing therethrough. A horizontal arm 29 connects said spheres 25 and 26 and is rigidly secured thereto at its ends to diametrically alined points thereon. Rigidly secured in any usual manner to the midsection of arm 29 and extending at right angles, vertically downward therefrom is the supporting member 30. Member 30 at its lower end is rigidly secured to the upper surface of the midsection of said offset portion 8 of shaft 7.

The said slot 24 through said arm 9 is provided upon its opposing vertical walls with insulated electrical contacts 31 and 32 respectively, each of which is alined with and adapted to be contacted singly by said contact 25. Said contacts 31 and 32 each extend through a respective side of said arm 9, and are respectively connected to the electric wires 33 and 34. Wire 33, battery 35 intervening, leads to one end of the winding of the electro-magnet 37. From the opposite end of said winding, wire 38 leads to the binding post 39 at the forward end of said shaft 7. Binding post 39 acts as a ground for completing the circuit. Said wire 34 leads, battery 40 intervening, to one end of the winding of the electro-magnet 41. From the opposite end of said winding wire 42 leads to said binding post 39.

Adjacent the front of the device and at the right end porton of the embodiment of same here shown, are provided, bolted to said base 1, the housing 43 for a usual clock motor, not shown. The upper portion of said housing is also provided with an end bearing not shown for the rotal chart cylinder 44, and with a usual means of imparting rotative motion, activated by said motor, to said cylinder. Adjacent said housing 43, and also bolted to base 1 is the supporting member 45 which rises vertically from said base, provides a support upon its face for electro-magnet 41, and at its forwardly extending upper portion provides a bearing 46 for one end portion of the long threaded screw 47.

Opposite said supporting member 45, and alined therewith at the left end portion of said base 1 is a supporting member 48, similar in structure and purpose to member 45. The end bearing for this end of screw 47 is indicated by the dotted lines as 49. Adjacent said member 48, is the vertical member 50, which, bolted to base 1, is provided at its upper portion with the other bearing 51 for the said chart cylinder 44.

Rigidly attached at the respective end portions of said screw 47 are the toothed ratchet wheels 52 and 53, the teeth of wheel 52 being designed to impart to it and to said screw 47 a clockwise motion. Wheel 53 is designed for a reverse or anti-clockwise motion.

Further details of design and construction will be disclosed as the operation of the device is explained.

As before recited, one of the objects to be attained by my invention is the measurement of a given substance in terms of its gravity as related to another and known substance, one of its purposes being the measurement of flue gas. In this application of the device the weight of the flue gas will be measured comparatively with that of the prevailing atmosphere. A principle involved in said application is that of the relative buoyancy of liquid or gaseous substances as directly related to their respective weights.

In the device as described it should be understood that same is to be constructed as an instrument of precision; that the weight of said balls 18 and 19 and their supports 16 and 17 and the weight of said rod 20, counterbalance 21 and arm 22 and are so distributed around the axis of rotation of said shaft 11 that if all buoyant effect of fluids were removed, the members attached to said shaft 11 would be in neutral rotational equilibrium, regardless of their rotational position. It will further be understood that normally the outer spheres 25 and 26 will contain said balls 18 and 19 centrally and without contacting same at any point.

It is to be noted that the sphere 25 has openings 27 and 28 therethrough which permit a free circulation of air at atmospheric pressure about the ball 25. Likewise sphere 26 is provided with like openings 27 and 28.

The flanged opening 27 in sphere 26 is seen to be provided with a removable light flexible hose 54. Through hose 54 a stream of flue gas is conducted slowly into said sphere 26. The gas will circulate freely about all sides of said ball 19 and will flow outward from sphere 26 through its opening 28. It will be noted that point of entry 27 is diametrically opposite point of exit 28, and the centers of both 27 and 28 are alined with the length of the supporting arm 17. The object of the flow of gas is to fill and keep filled all that space shown as 55 between the said ball 19 and said shell 26, with flue gas without causing any motion of ball 19 due to current of the gas flowing thereabout.

When the flue gas has, by its flow, expelled the normal air from said space 55, ball 19 will be left to float upon or to sink through, as the case may be, the enveloping film of gas. If the flue gas in sphere 26 is lighter than the air in sphere 25, it will fail to support or to float said ball 19. Ball 19 will drop within said sphere 26. This slight motion will be imparted to arm 17, causing a slight rotational movement of the balanced shaft 11. Contact arm 22 will be swung in a clockwise arc, causing contact 25 to close upon contact 31, thus closing the electric circuit through wire 33 and battery 35, energizing the electro-magnet 37, causing its core 56 to move upwardly. In this movement core 56 impinges one of the teeth of the ratchet wheel 52, causing this wheel to rotate slightly in a measured degree in anticlockwise direction. The rotation of said wheel 52 causes a like rotative movement of the long threaded shaft 47, upon which said wheel 52 is keyed. The rotational movement of shaft 47 causes the threaded nut 57, best shown in Fig. 3, to travel slightly to the left, moving arm 9 and breaking the contact between said contacts 25 and 31. Core 56 returns by gravity to its original position. A pen 58 upon the arm 59 which extends forward and down from said nut 57, contacts said chart roll 44 and records thereupon any movement either to right or left of the nut 47 and pen 58. Roll 44 is given a continuous, or if desired, an intermittent rotational movement by the said spring motor within housing 43. The above described movement of nut 57 is imparted to the arm 9 by means, as may best be seen in Figure 3, of the head 59 of the projection 60 which extends from nut 57, and is slidably received in the longitudinal slot shown as 61 in the face of said arm 9.

The said movement to the left of arm 9 will impart a rotational movement of shaft 7 and a movement to the right, through an arc, of the supporting member 30 and crossbar 29. Sphere 26 will be moved slightly, through an arc, outward to the right and downward, also sphere 25 will be moved upward and to the right. If at the termination of this slight movement, the buoyancy of the gas in space 55 is insufficient to float in balanced position therein the ball 19, the contact between 25 and 31 will be made as before, the core 56 will turn the ratchet 52 one space, screw 47 will rotate as before, nut 57 will travel to the left, the pen record will be made as before, and through the before described chain of movements, the sphere 26 will again be moved slightly outward and downward. The movements as described will continue until such time as the buoyant effect of the gas in 55 is sufficient to sustain in neutral position the ball 19 centrally therewithin. When equilibrium is reached no further mechanical action is set up and a reading of chart cylinder 44 will disclose the degree of the angle between arm 9 and vertical. The angle at which equilibrium is established, being known, the relation between the buoyancy of the gas in 55 and the buoyancy of the air in similar space 61 of sphere 25, may be readily calculated. The buoyancy of any fluid being in direct ratio with its specific gravity, the specific gravity of air being known, the specific gravity of the gas may readily be calculated. If desired, the chart 44 may be platted with all such calculation previously made. The chart then will show without further calculation the direct information desired.

It will be understood, that in the operation of the device as described, should the content of space 55 be heavier than the content of space 61, its buoyant power will be greater than that of the content of space 61, ball 18 will drop in space 61, ball 19 will rise in space 55, and arm 16 will rotate shaft 11 in anticlockwise fashion, arm 22 and 23a will close contact 25 with contact 32, core 62 of magnet 41 will rotate ratchet 53 one space in clockwise fashion, screw 47 will turn clockwise, nut 57 will move to the right, and in same manner as described but in reverse direction, the balls 18 and 19 will seek and find a point of equilibrium, which will be recorded upon said chart 44.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device other than as herein described as fairly fall within the scope of my invention.

Having thus described my invention, what is claimed and desired to be secured by Letters Patent, is:

1. A device, as described, embodying a pair of hollow shells spacedly supported upon a first standard, one of said shells having openings for admitting one fluid, the other having an inlet and an outlet for another fluid, a pair of hollow airtight floats spacedly disposed upon a second, balanced standard, one of said floats within each of said shells, said standards having their axes of rotation identically located and operable thereon separately.

2. A device, as described, embodying a pair of hollow shells spacedly supported upon a first standard, one of said shells having openings for admitting one fluid, the other having an inlet and an outlet for another fluid, a pair of hollow airtight floats spacedly disposed upon a second, balanced standard, one of said floats within each of said shells, said standards having their axes of rotation identically located and operable thereon separately, and means for tilting said shells on their axis when the difference in buoyancy of one of said fluids in one shell and said fluid in the other shell causes said floats to tilt upon their axis.

3. A device, as described, embodying a pair of hollow shells spacedly supported upon a first standard, one of said shells having openings for admitting one fluid, the other having an inlet and an outlet for another fluid, a pair of hollow airtight floats spacedly disposed upon a second, balanced standard, one of said floats within each of said shells, said standards having their axes of rotation identically located and operable thereon separately, means for tilting said shells on their axis when the difference in buoyancy of one of said fluids in one shell and said fluid in the other shell causes said floats to tilt upon their axis, and means for recording the movement of said first standard.

4. A device as described, embodying a pair of balanced, hollow shells, one having an inlet and outlet for air, the other having an inlet and outlet for gases or liquid, said shells mounted rigidly upon the ends of the cross arm of a T shaped support, said support mounted rigidly upon the crank of a crank shaft, said shaft mounted pivotally between standards supported by a base, said shaft having a downward extending arm upon one of its ends, a pair of hermetically sealed, balanced, hollow floats slightly smaller than and conforming to the shape of the interior of said shells, one of said floats within each of said shells, said floats mounted rigidly upon the upper ends of the arms of a V shaped support, the lower end of the said V shaped support pivotally mounted on a cross member extending between the shoulders of said crank in axial alinement with the axis of said shaft, said cross-member having a weight suspended adjustably below its axis for balancing said floats thereabove.

5. A device as described, embodying a pair of balanced, hollow, spherical shells, one having an inlet and outlet for one fluid, the other having an inlet and outlet for another fluid, said shells mounted rigidly upon the ends of the cross arm of a T shaped support, said support mounted rigidly upon the crank of a crank shaft, said shaft mounted pivotally between standards supported by a base, said shaft having a downward extending arm upon one of its ends, a pair of hermetically sealed, balanced, hollow, spherical floats slightly smaller in diameter than the interior of said shells, one of said floats within each of said shells, said floats mounted rigidly upon the upper ends of the arms of a V shaped support, the lower end of said V shaped support pivotally mounted on a cross member extending between the shoulders of said crank in axial alinement with the axis of said shaft, said cross member having a weight suspended adjustably below its axis for balancing said floats thereabove, and means for actuating said downward extending arm for tilting said shells on their axis when the difference in buoyancy of said fluid in one shell and said fluid in the other shell causes said floats to tilt upon their axis.

6. A device as described, embodying a pair of balanced, hollow, spherical shells, one having an inlet and outlet for one fluid, the other having an inlet and outlet for another fluid, said shells mounted rigidly upon the ends of the cross arm of a T shaped support, said support mounted rigidly upon the crank of a crank shaft, said shaft mounted pivotally between standards supported by a base, said shaft having a downward extending arm upon one of its ends, a pair of hermetically sealed, balanced, hollow, spherical floats slightly smaller in diameter than the interior of said shells, one of said floats within each of said shells, said floats mounted rigidly upon the upper ends of the arms of a V shaped support, the lower end of said V shaped support pivotally mounted on a cross member extending between the shoulders of said crank in axial alinement with the axis of said shaft, said cross member having a weight suspended adjustably below its axis for balancing said floats thereabove, means for actuating said downward extending arm for tilting said shells on their axis when the difference in buoyancy of said fluid in one shell and said fluid in the other shell cause said floats to tilt upon their axis, and means for recording the movement of said downward extending arm.

7. A device, as described, having in combination, a pair of balanced, hollow, spherical shells, one having an inlet and outlet for one fluid, the other having an inlet and outlet for another fluid, said shells mounted rigidly upon the ends of the cross arm of a T shaped support, said support mounted rigidly upon the crank of a crank shaft, said shaft mounted pivotally between standards supported by a base, said shaft having a downward extending arm upon one of its ends, a pair of hermetically sealed, balanced, hollow, spherical floats slightly smaller in diameter than the interior of said shells, one of said floats within each of said shells, said floats mounted rigidly upon the upper ends of the arms of a V shaped support, the lower end of said V shaped support pivotally mounted on a cross member extending between the shoulders of said crank in axial alinement with the axis of said shaft, said cross member having a weight suspended adjustably below its axis for balancing said floats thereabove, means for actuating said downward extending arm for tilting said shells on their axis when the difference in buoyancy of said fluid in one shell and said gases or fluid in the other shell cause said floats to tilt upon their axis, and means for recording the movement of said downward extending arm.

DAVID O. LIMA.